US011598895B2

(12) United States Patent
Wilson et al.

(10) Patent No.: US 11,598,895 B2
(45) Date of Patent: Mar. 7, 2023

(54) ULTRASONIC WAVEFORM PROCESSING USING DECONVOLUTION IN DOWNHOLE ENVIRONMENTS

(71) Applicant: Halliburton Energy Services, Inc., Houston, TX (US)

(72) Inventors: Glenn Andrew Wilson, Houston, TX (US); Arthur Cheng, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/342,642

(22) PCT Filed: May 25, 2018

(86) PCT No.: PCT/US2018/034741
§ 371 (c)(1),
(2) Date: Apr. 17, 2019

(87) PCT Pub. No.: WO2019/226178
PCT Pub. Date: Nov. 28, 2019

(65) Prior Publication Data
US 2021/0356617 A1    Nov. 18, 2021

(51) Int. Cl.
*E21B 47/08* (2012.01)
*G01V 1/46* (2006.01)
(Continued)

(52) U.S. Cl.
CPC .............. *G01V 1/50* (2013.01); *E21B 47/005* (2020.05); *E21B 47/0025* (2020.05);
(Continued)

(58) Field of Classification Search
CPC .............. G01V 1/50; G01V 2210/1299; G01V 2210/1429; G01V 2210/6226;
(Continued)

(56) References Cited

U.S. PATENT DOCUMENTS 5,151,882 A    9/1992 Kingman
5,671,136 A *  9/1997 Willhoit, Jr. .............. G01V 1/30
                                                    702/18
(Continued)

FOREIGN PATENT DOCUMENTS

GB          2254921 A      10/1992
WO    WO 2011/097432 A2    8/2011
(Continued)

OTHER PUBLICATIONS

Althoff et al., "MWD Ultrasonic Caliper Advanced Detection Techniques", SPWLA 39$^{th}$ Annual Logging Symposium, Paper III, 1998.
(Continued)

*Primary Examiner* — Daniel L Murphy
(74) *Attorney, Agent, or Firm* — Novak Druce Carroll LLP

(57) ABSTRACT

Deconvolution-based processing of ultrasonic waveforms enables robust calculation of two-way travel time for an ultrasonic caliper, particularly in the presence of multiple, proximal reflectors (e.g., mud cake, formation, casing, cement, etc.).

16 Claims, 8 Drawing Sheets

(51) Int. Cl.
  *G01V 1/48* (2006.01)
  *G01V 1/50* (2006.01)
  *E21B 47/005* (2012.01)
  *E21B 47/002* (2012.01)
  *E21B 49/00* (2006.01)
  *E21B 47/18* (2012.01)

(52) U.S. Cl.
  CPC .............. *E21B 49/00* (2013.01); *E21B 47/18* (2013.01); *G01V 2210/1299* (2013.01); *G01V 2210/1429* (2013.01); *G01V 2210/6226* (2013.01)

(58) Field of Classification Search
  CPC .... E21B 49/00; E21B 47/0025; E21B 47/005; E21B 47/18
  USPC .......................................................... 367/27
  See application file for complete search history.

(56) References Cited

U.S. PATENT DOCUMENTS

| | | | |
|---|---|---|---|
| 5,987,385 | A | 11/1999 | Varsamis et al. |
| 6,253,155 | B1 | 6/2001 | Hagiwara |
| 6,618,322 | B1 | 9/2003 | Georgi |
| 6,704,436 | B1 * | 3/2004 | Anxionnaz ............ G01V 11/00 382/109 |
| 7,069,775 | B2 | 7/2006 | Fredette et al. |
| 7,558,675 | B2 | 7/2009 | Sugiura |
| 2009/0213690 | A1 | 8/2009 | Steinsiek et al. |
| 2010/0103774 | A1 | 4/2010 | Haldorsen et al. |
| 2011/0073368 | A1 * | 3/2011 | Han ........................ E21B 47/01 175/40 |
| 2012/0109528 | A1 | 5/2012 | Bolshakov et al. |
| 2016/0274260 | A1 * | 9/2016 | Quintero .................. G01V 5/12 |

FOREIGN PATENT DOCUMENTS

| | | | | |
|---|---|---|---|---|
| WO | WO 2015/023386 | A1 | 2/2015 | |
| WO | WO-2017048264 | A1 * | 3/2017 | ............... G01V 1/46 |

OTHER PUBLICATIONS

International Search Report and the Written Opinion of the International Search Authority, or the Declaration, dated Feb. 20, 2019, PCT/US2018/034741, 14 pages, ISA/KR.

Oldenburg et al., "Recovery of the Acoustic Impedance from Reflection Seismograms", Geophysics, vol. 48, No. 10, pp. 1318-1337, 1983.

* cited by examiner

ULTRASONIC WAVEFORM PROCESSING USING DECONVOLUTION IN DOWNHOLE ENVIRONMENTS

PRIORITY

The present application is a U.S. National Stage patent application of International Patent Application No. PCT/US2018/034741, filed on May 25, 2018, the benefit of which is claimed and the disclosure of which is incorporated herein by reference in its entirety.

FIELD OF THE DISCLOSURE

The present disclosure relates generally to downhole ultrasonic acoustic measurements and, more specifically, to a system and method for processing downhole ultrasonic waveforms using deconvolution.

BACKGROUND

Oilfield operators demand access to a great quantity of information regarding the conditions encountered downhole. Such information typically includes characteristics of the earth formations traversed by the borehole and data relating to the size and configuration of the borehole itself. The collection of information relating to conditions downhole, commonly is referred to as "logging," can be performed by several methods including logging while drilling ("LWD"), measurement while drilling ("MWD"), and wireline logging.

Among the available wireline and LWD tools are a variety of acoustic logging tools including, in particular, ultrasonic "caliper" tools. Such tools employ ultrasonic signals to perform measurements, for example, measuring a distance to the borehole wall. With an appropriate set of such distance measurements, the borehole size and shape can be estimated, as well as the relative position of the tool within the borehole. The ultrasonic tools may also be used in downhole acoustic imaging for casing thickness measurement, cement evaluation for cased holes, and formation evaluation for open holes.

Ultrasonic calipers typically utilize a piezoelectric transducer in a pitch-catch mode, where a source waveform (or "pulse") is transmitted through the borehole fluids, which then reflects from (and transmits through) the formation. The reflected waveforms ("echoes") are measured as received waveforms. The piezoelectric transducer is designed such that the source waveform is preferably localized so the ring-down is sufficient so that the reflected waveforms can be measured without source waveform contamination.

Conventional ultrasonic processing has a number of disadvantages. In conventional ultrasonic caliper processing (e.g., Althoff et al., *MWD Ultrasonic Caliper Advanced Detection Techniques*, SPWLA 39$^{th}$ Annual Logging Symposium, Paper III, 1998; Market et al., *Reliable LWD Caliper Measurements*, SPE Offshore Europe Oil and Gas Conference and Exhibition, Aberdeen, UK, SPE 146245, 2011), echo detection is typically performed by (a) cross-correlating an a priori wavelet template with the received waveforms (or "echo train"), (b) applying a time-variable gain, and (c) peak detection for calculating the two-way travel-time. However, such techniques are very vulnerable to noise (e.g., ring down waveform or noise conveyed between transducers through the tool body) and have difficulty segregating between multiple reflectors (e.g., mud cake, formation, casing, cement, etc.). Moreover, conventional techniques are not amplitude preserving (i.e., can only derive distance to borehole wall) and, therefore, cannot provide quantitative information such as acoustic impedance necessary for imaging.

DESCRIPTION OF ILLUSTRATIVE EMBODIMENTS

Illustrative embodiments and related methods of the present disclosure are described below as they might be employed in systems and methods to process ultrasonic waveforms using deconvolution techniques. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of this disclosure will become apparent from consideration of the following description and drawings.

As described herein, illustrative systems and methods of the present disclosure apply deconvolution processing to ultrasonic waveforms to enable robust calculation of two-way travel time for an ultrasonic caliper, particularly in the presence of multiple, proximal reflectors (e.g., mud cake, formation, casing, cement, etc.). Based on deconvolution of the source wavelet from the received waveforms, a reflectivity model is derived from which waveform peak detection is achieved for accurately calculating the two-way travel-time. In certain methods, the travel time is determined as the difference between the initial firing and the first amplitude peak (e.g., for caliper and imaging), while in other methods the travel time is determined as the time between amplitude peaks (for cement bond logging, e.g.). The source wavelet may be measured in-situ, or may be an a priori wavelet template. The reflectivity may then be processed for acoustic impedance. Azimuthal measurements may be acquired as the tool rotates, thereby enabling an acoustic impedance image to be generated.

In a generalized method, an ultrasonic tool is deployed along a wellbore, whereby ultrasonic waveforms are transmitted and received. The received waveforms are processed using a deconvolution technique that is amplitude preserving, thus allowing derivation of quantitative information (e.g., impedance) from the measurements. The deconvolution techniques described herein are "amplitude preserving" because the amplitude peaks of the source wavelet and received waveforms are preserved during deconvolution. The preserved amplitude peaks may then be used to derive quantitative information such as, for example, caliper measurements, formation acoustic imaging, and cement bond logs.

Figure 1:
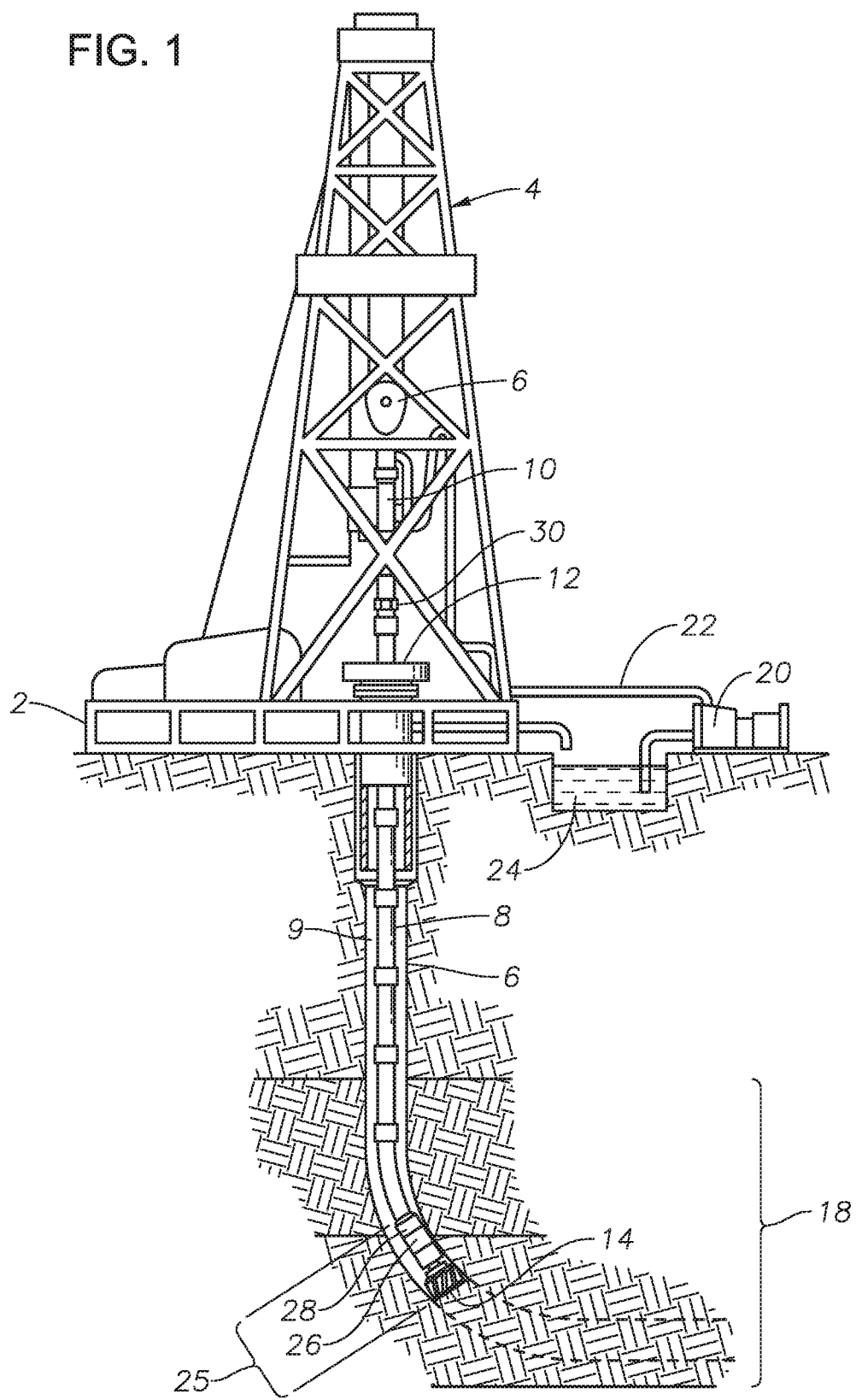
FIG. 1 shows an illustrative LWD environment, according to certain embodiments of the present disclosure.

FIG. 1 shows an illustrative LWD environment, according to certain embodiments of the present disclosure. In FIG. 1, a drilling platform 2 supports a derrick 4 having a traveling block 6 for raising and lowering a drill string 8. A drill string kelly 10 supports the rest of drill string 8 as it is lowered through rotary table 12. Rotary table 12 rotates drill string 8, thereby turning drill bit 14. As drill bit 14 rotates, it creates a borehole 17 that passes through various formations 18. A pump 20 circulates drilling fluid through feed pipe 22 to kelly 10, downhole through the interior of drill string 8, through orifices in drill bit 14, back to the surface via annulus 9 around drill string 8, and into a retention pit 24. The drilling fluid transports cuttings from borehole 17 into pit 24 and aids in maintaining the integrity of borehole 17.

Drill bit 14 is just one piece of an LWD assembly that includes one or more drill collars 26 and logging tool 28. Drill collars 26 are thick-walled steel pipe sections that provide weight and rigidity for the drilling process. Logging tool 28 (which may be built into one of the drill collars) gathers measurements of various drilling or formation parameters. Without limitation, logging tool 28 may be integrated into the bottom-hole assembly 25 near bit 14 to collect measurements. The collected measurements may be plotted and used for steering the drill string 8 and/or to analyze formation properties. In accordance with at least some embodiments, logging tool 28 corresponds to an acoustic logging tool with one or more high-purity acoustic transmitters. Illustrative transducers are present in commercially available instruments including, for example, Halliburton's XBAT Caliper ("XCAL") tool, AcoustiCaliper ("ACAL") tool, Pinger Caliper ("PCAL"—part of the Azimuthal Litho-Density tool) sensor, and Circumferential Acoustic Scanning Tool ("CAST").

Measurements from logging tool 28 can be acquired by a telemetry sub (e.g., integrated with logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used. In certain illustrative embodiments, measurements collected from the logging tool 28 are processed by a computer system to produce one or more well logs for analysis. The contemplated logs include acoustic logging measurements such as, for example, the propagation velocities of compressional and shear waves, the received waveforms, and derivable values such as acoustic impedance.

Figure 2:
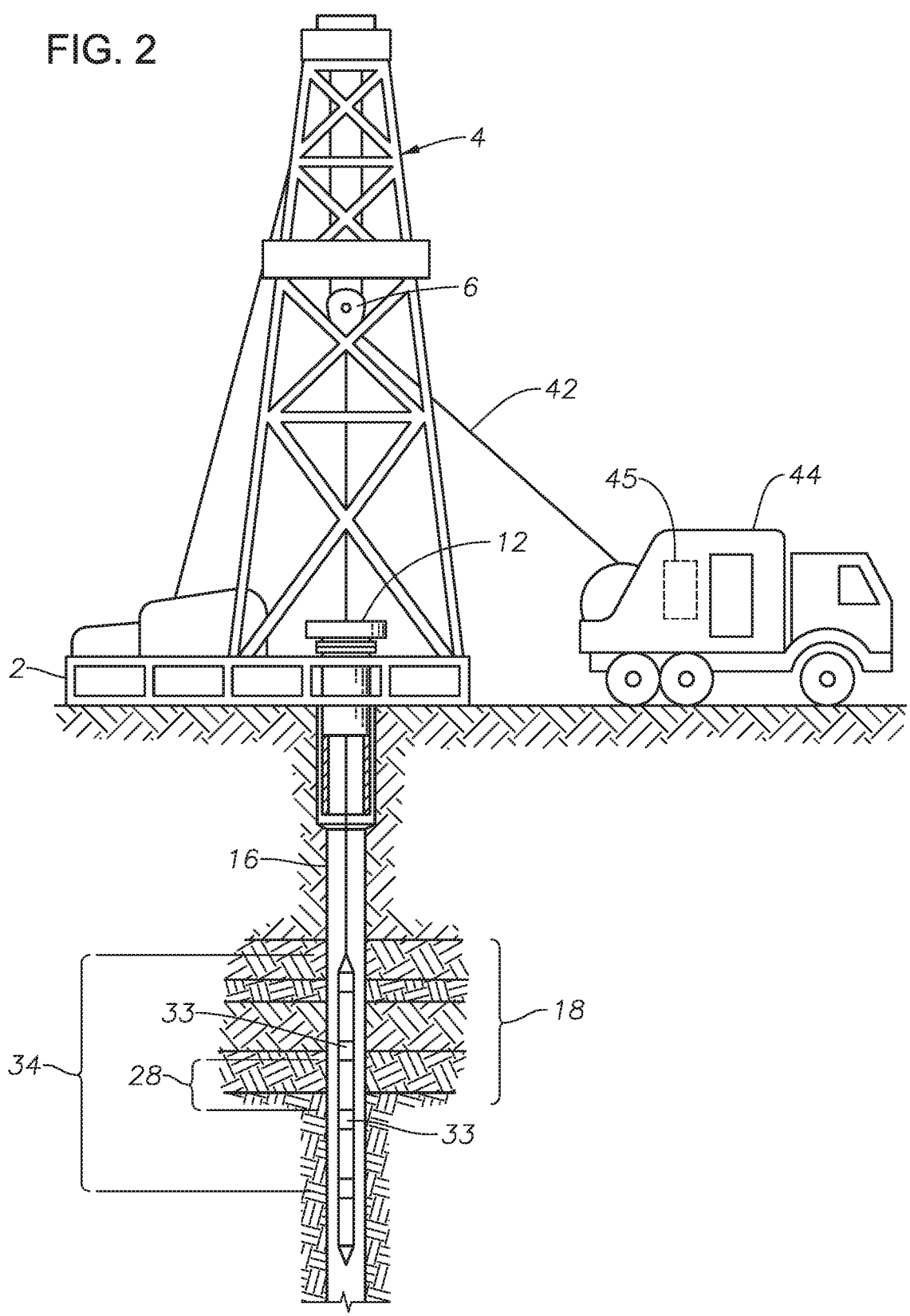
FIG. 2 illustrates a wireline logging application according to certain embodiments.

At various times during the drilling process, drill string 8 may be removed from borehole 17 as shown in FIG. 2, which illustrates a wireline logging application according to certain embodiments. Once the drill string has been removed, logging operations can be conducted using wireline logging sonde 34 suspended in the borehole 17 by conveyance 42 having conductors for transporting power to logging sonde 34 and telemetry from logging sonde 34 to the surface. Conveyance 42 may take various forms including, for example, a wireline, slickline, pipe, coiled tubing, or tractor-based conveyances. Power may be provided via the conveyance 42, a battery on-board some downhole component. Telemetry may also be provided or some or all the measurements may be stored in downhole memory and retrieved at the surface. In some embodiments, logging sonde 34 may have pads and/or centralizing members to maintain the tool near the axis of the borehole 17 as the tool is pulled uphole.

It should be noted that various types of formation property sensors can be included with wireline logging string 34. As shown, illustrative wireline logging string 34 includes logging tool 28, which may collect acoustic logging data as described herein. Logging tool 28 may be coupled to other modules of wireline logging string 34 by one or more adaptors 33. Logging facility 44 collects measurements from logging sonde 34, and includes a computer system 45 for processing and storing the measurements gathered by the sensors. Among other things, computer system 45 may include a non-transitory computer-readable medium (e.g., a hard-disk drive and/or memory) capable of executing instructions to perform such tasks. In addition to collecting and processing measurements, computer system 45 may be capable of controlling logging string 34 and logging tool 28. Logging facility 44 may further include a user interface (not shown) which displays the measurements, for example, a monitor or printer.

The computer processing system described herein may take a variety of forms, and may be located downhole or at the surface. For example, the processing circuitry may include at least one processor, a non-transitory, computer-readable memory, transceiver/network communication module, and optional I/O devices and user interface, all interconnected via a system bus. Software instructions executable by the processor for implementing the functions of the illustrative ultrasonic logging tools and transducers described herein may be stored in memory.

In certain embodiments, the processing circuitry may be connected to one or more public and/or private networks via one or more appropriate network connections. It will also be recognized that the software instructions to perform the functions of the present disclosure may also be loaded into memory from a CD-ROM or other appropriate storage media via wired or wireless methods.

Moreover, those ordinarily skilled in the art will appreciate that embodiments of this disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. This disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Figure 3:
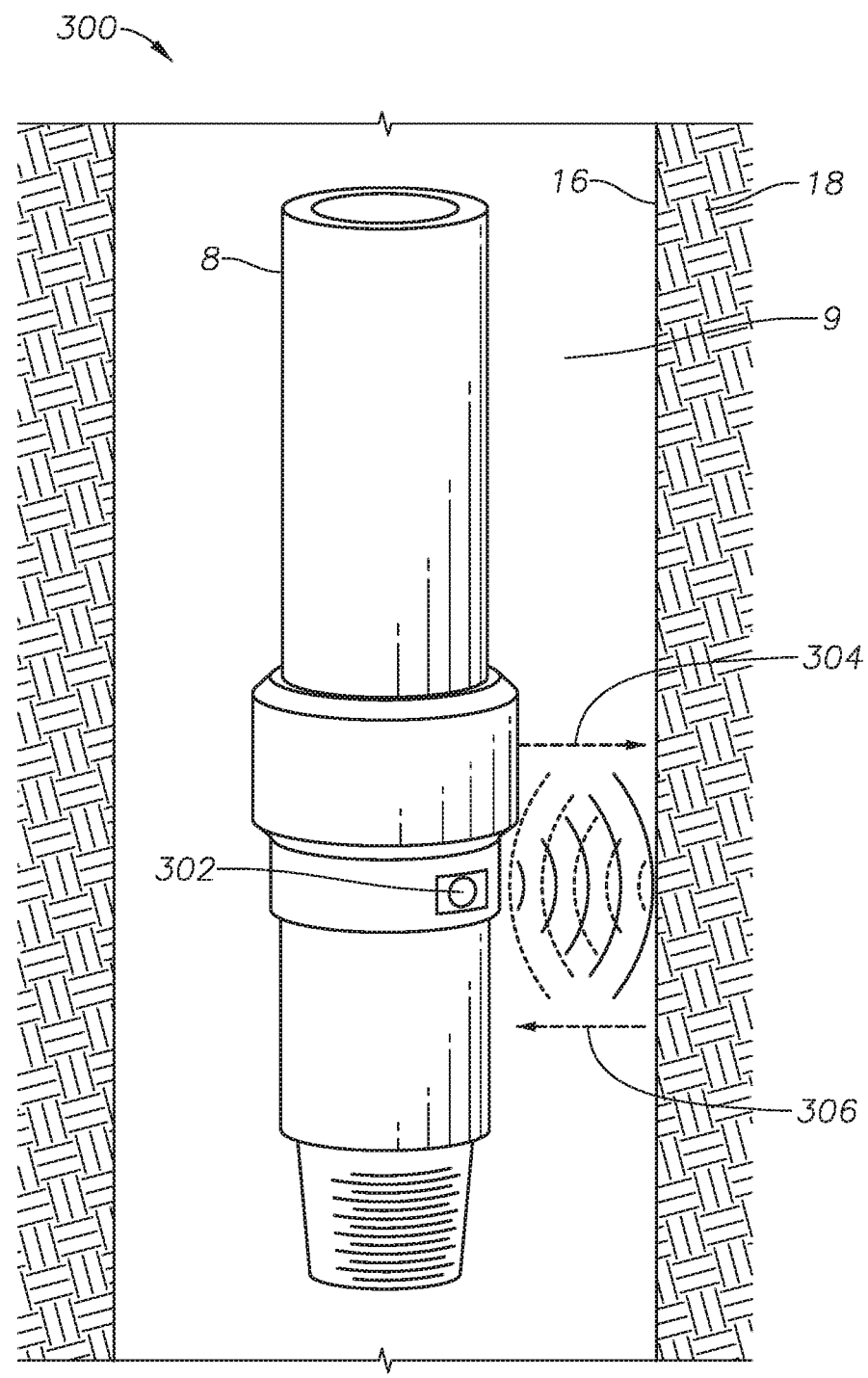
FIG. 3 shows an illustrative acoustic wave generation and measurement tool 300 having a single acoustic transducer that acts both as a transmitter and receiver.

FIG. 3 shows an illustrative acoustic wave generation and measurement tool 300 (hereinafter "tool 300") having a single acoustic transducer 302 that acts both as a transmitter and receiver (i.e., transceiver). However, in alternate embodiments, a pitch-catch type tool may be used in which separate transducers transmit and receive waveforms. Tool 300 may be similar to logging tool 28 of FIGS. 1 and 2, thus being part of drill string 8 (or logging string 34) conveyed downhole within borehole 17. Acoustic transducer 302 transmits and receives acoustic waveforms to provide caliper measurements. For example, acoustic transducer 302 may be comprised of a piezoelectric transducer. Upon operation, acoustic transducer 302 transmits a first acoustic waveform or interrogation waveform 304 towards borehole wall 16. Upon interacting with borehole wall 16, a second acoustic waveform or return waveform 306 is generated back in the direction of tool 300 due to acoustic mismatches between the borehole fluid within the annulus 9 and borehole wall 16.

Turning to the fundamentals of the present disclosure, consider a pulse-echo ultrasonic transducer formed from a piezoelectric crystal, which is typical of an LWD caliper, whereby the LWD tool is located in a fluid-filled borehole. Assumptions of normal incidence, layer homogeneity, and isotropy with small strains are valid, such that pressure and velocity satisfy a one-dimensional wave equation. The observed ultrasonic (receiver) response R(t) is a convolution of the source waveform S(t) with the reflectivity (or impulse) response G (t):

$$R(t)=S(t)*G(t)+n(t)=\int_0^t S(t-\tau)G(\tau)d\tau+n(t), \quad \text{Eq.(1)}$$

where n(t) is a noise term. A discrete form of equation (1) is given as:

$$R(k)=\sum_{j=1}^{k} S(k-j)G(j)+n(k), \quad \text{Eq.(2)}$$

where k=1, ... N.

The source S and receiver R waveforms are the input or output voltages across the piezoelectric crystal, respectively, and both may be measured. For a given firing sequence, the duration of excitation for the source waveform (e.g., measured during transmission) is known, enabling S to be well defined. This also implies that S may change during different firing sequences and/or measured depths, e.g., due to transducer coupling to the drilling fluids or formation. Alternatively, in certain other embodiments, S may be an a priori waveform template. It follows that R is also well defined. Typically, S is much shorter in duration than R, and is band limited in frequency. In such a case, a deterministic deconvolution technique may be applied. Thus, in certain embodiments, a Fourier transform is performed:

$$a(\omega) = F[A(t)] = \int_{-\infty}^{+\infty} A(t)e^{-i\omega t}dt, \quad \text{Eq. (3)}$$

such that:

$$r(\omega)=s(\omega)g(\omega)+n(\omega). \quad \text{Eq.(4)}$$

n(ω) may be absorbed into r(ω), such that:

$$g(\omega)=r(\omega)/s(\omega), \quad \text{Eq.(5)}.$$

In the likelihood that s(ω) contains zeros such that Equation 5 is unstable, Equation 5 can be modified as:

$$s^*(\omega)r(\omega)=s^*(\omega)s(\omega)g(\omega)\approx[s^*(\omega)s(\omega)+\alpha]g(\omega), \quad \text{Eq.(6)},$$

where * denotes the complex conjugate, and a is a small positive number, such that:

$$g(\omega) = \frac{s^*(\omega)r(\omega)}{s^*(\omega)s(\omega) + \alpha}, \quad \text{Eq. (7)}$$

is unconditionally stable. Given Equation 7, the inverse Fourier transform is applied as:

$$G(t) = F^{-1}[g(\omega)] = \frac{1}{2\pi}\int_{-\infty}^{+\infty} g(\omega)e^{+i\omega t}d\omega. \quad \text{Eq. (8)}$$

Therefore, the impulse response is now independent of the system characteristics (i.e., deconvolved), and dependent only upon the borehole and other reflectors. In certain embodiments, the deconvolution algorithm may contain (and compensate for) attenuation terms, and may be based on deterministic or predictive methods of deconvolution. The deconvolved waveform may then be used to derive any number of downhole measurements including, for example, wellbore size (i.e., distance), acoustic impedance, cement bond quality, and various formation parameters. For example, using the deconvolved waveforms, a reflectivity model may be derived from which waveform peak detection is achieved for accurately calculating the two-way travel-time, and for calculating the acoustic impedances of fluids, casing, cement, or formations.

Figure 4:
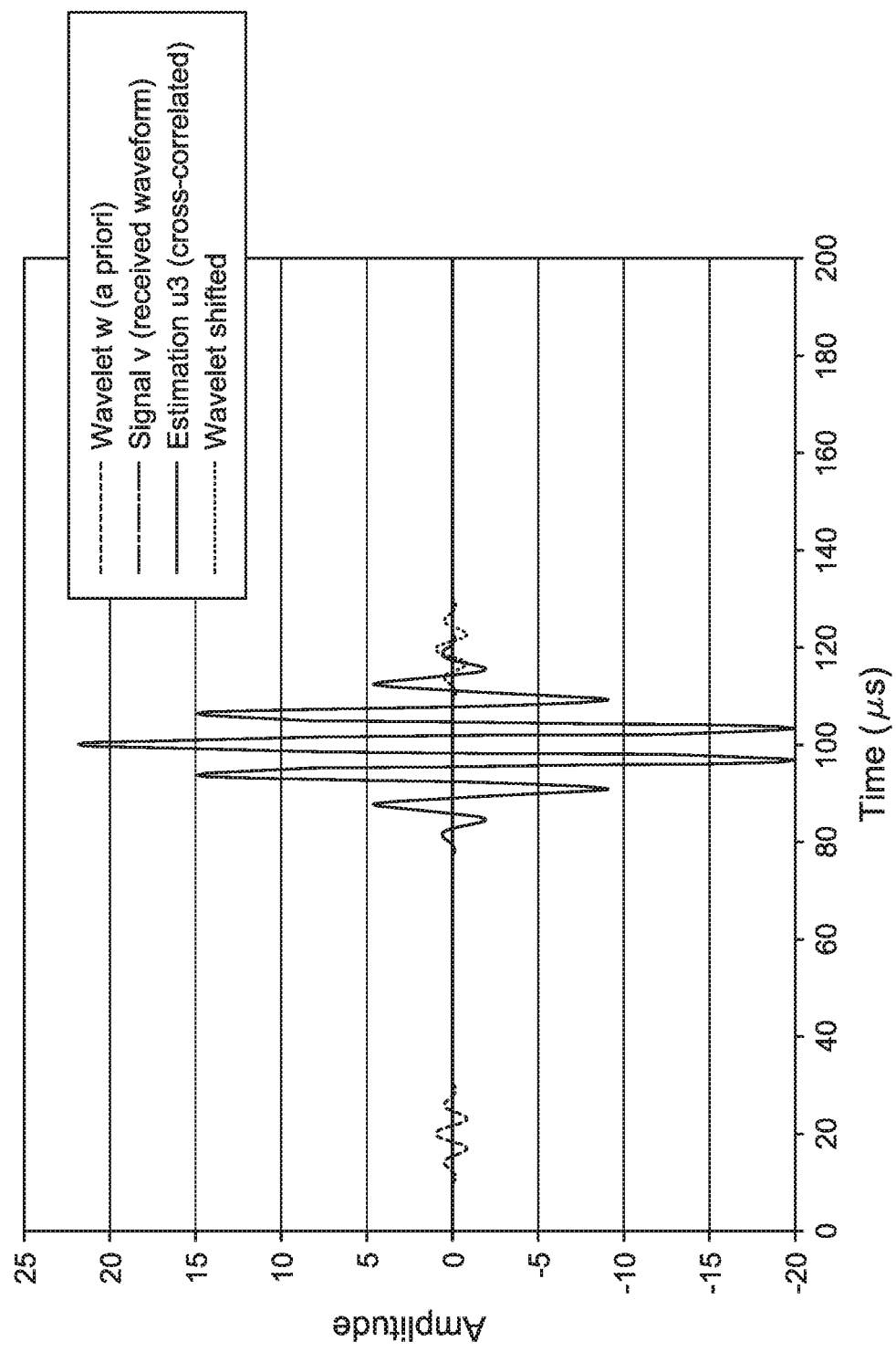
FIG. 4 plots a conventional ultrasonic waveform processing technique which cross-correlates an a priori wavelet template with the received waveforms.
Figure 5:
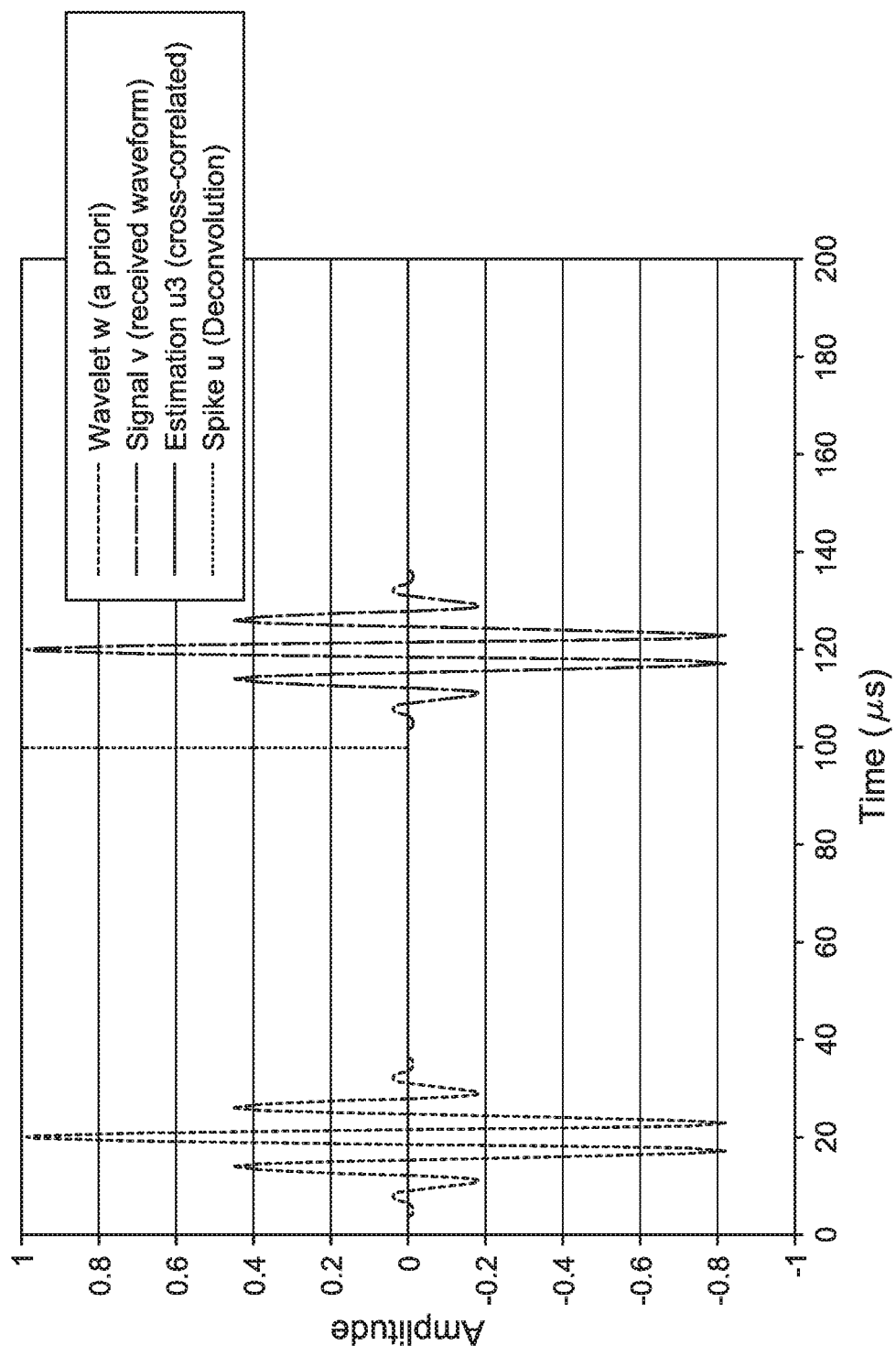
FIGS. 5 and 6 plot illustrative embodiment(s) of the present disclosure which deconvolves an a priori wavelet template from the received waveforms.
Figure 6:
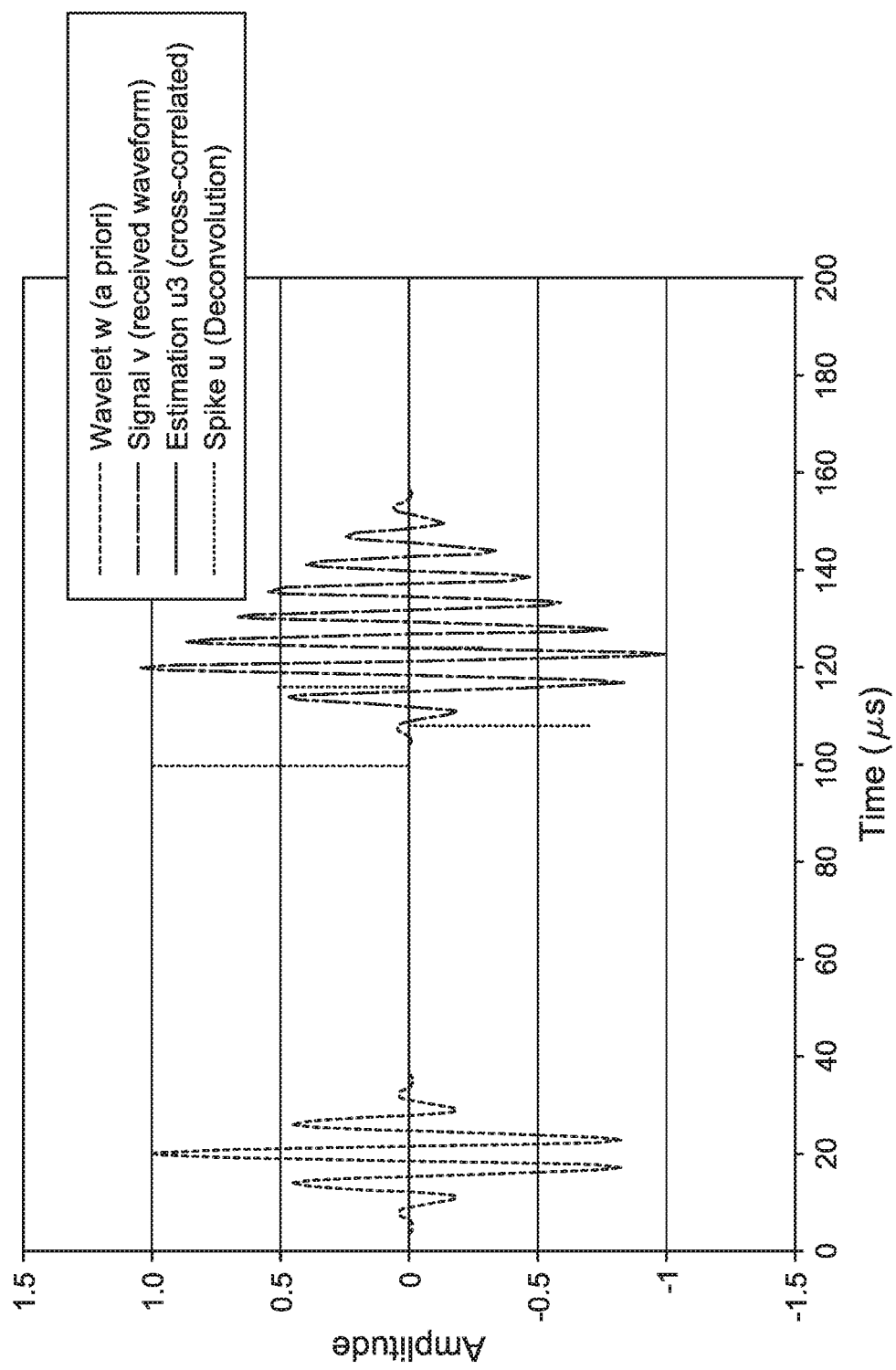
Figure 7:
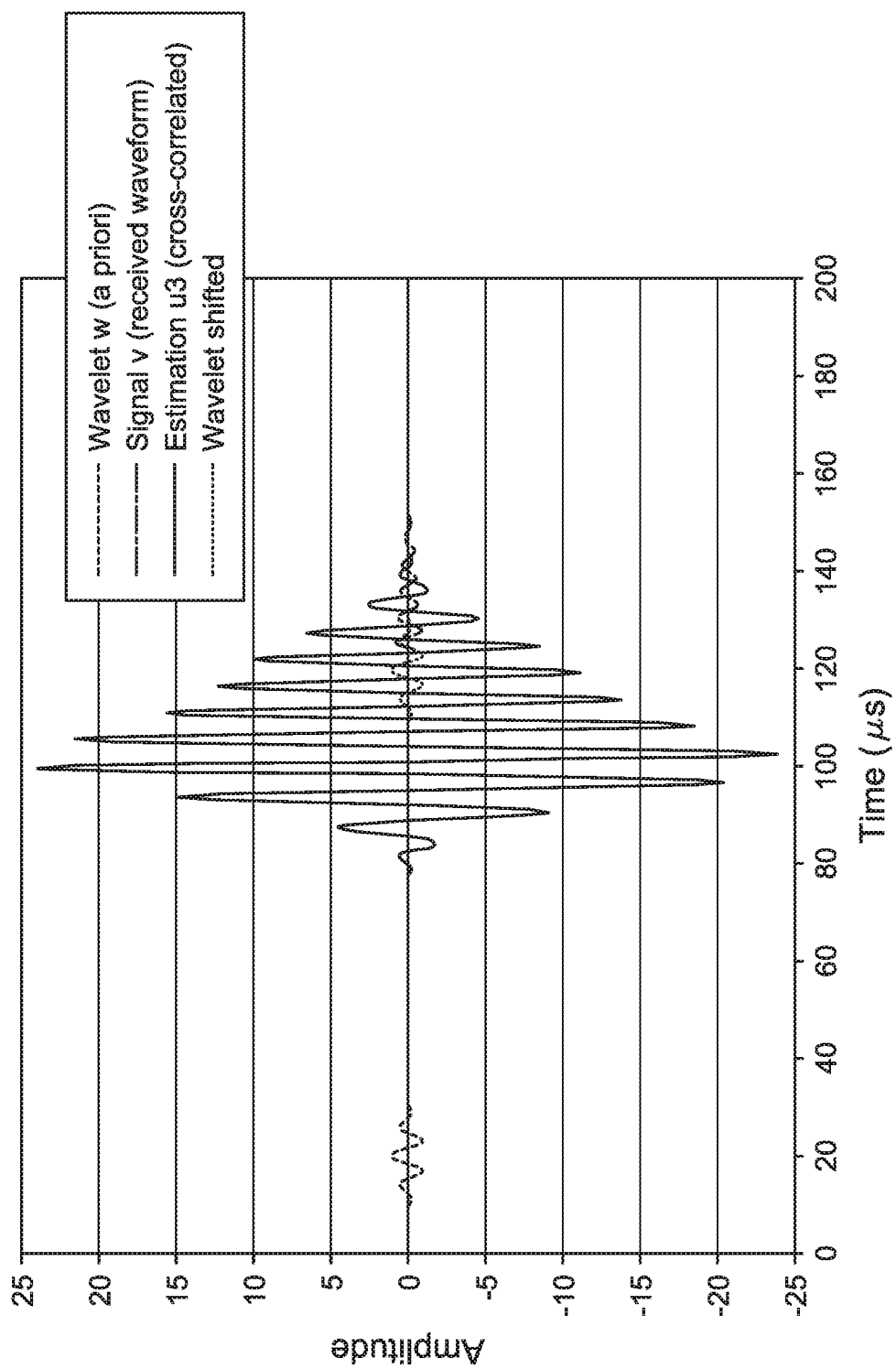
FIG. 7 plots a conventional cross-correlation processing of an a priori wavelet template with the received waveform.

FIG. 4 plots a conventional ultrasonic waveform processing technique which cross-correlates an a priori wavelet template with the received waveforms. The peak amplitude of the wavelet and received waveform are selected for calculating the two-way travel-time. As can be seen, however, the amplitude peak of the source wavelet is not preserved because the cross-correlation itself is not an amplitude preserving operation, i.e., it effectively multiplies the amplitudes of the a priori and received waveforms. Note signal v (received waveform) is not shown. FIG. 5 plots an illustrative embodiment of the present disclosure which deconvolves an a priori wavelet template with the received waveforms. Note estimation u3 is not shown. Here, using the methods described herein, the deconvolved "spike u" preserves the amplitude peak of the source wavelet. The amplitude peak may then be selected for calculating the two-way travel-time, which is then used to derive various downhole measurements. While the same amplitude peak is selected using both methods of FIGS. 4 and 5, the use of deconvolution in FIG. 5 provides much improved noise resilience (i.e., deconvolved "spike u" is clearly distinguishable from the received waveform). For example, deconvolution is able to better segregate multiple reflectors, as illustrated in FIG. 6 which shows an illustrative embodiment of the present disclosure. The reflectivity profile (i.e., the three deconvolved amplitude spikes, each identified as spike u) consists of the multiple reflectors identified by the deconvolved amplitude spikes. As can be seen, the reflectors (e.g., fluid, mud cake, cement bond, casing, formation, etc.) are clearly recovered. In contrast, the conventional cross-correlation approach (e.g., FIG. 4) provides no reflectivity profile (no deconvolved spike u) and fails to clearly recover any reflectors. Note estimation u3 is also not shown. FIG. 7 further illustrates this phenomenon as well, as it illustrates the conventional cross-correlation processing of an a priori wavelet template with the received waveform. Note signal v (received waveform) is not shown. As shown, the multiple reflectors are not recovered; rather, just a single amplitude peak is recovered which provides no information of borehole characteristics.

In certain other illustrative methods, for the purpose of borehole acoustic impedance imaging, the acoustic impedance of the fluid-formation boundary is important. For a two-layer model in certain methods, the reflectivity coefficient at the fluid-formation boundary is dependent upon the acoustic impedance contrast:

$$r_{12} = \frac{Z_2 - Z_1}{Z_2 + Z_1}, \quad \text{Eq. (9)}$$

where 2 denotes the formation, 1 denotes the fluid, and:

$$Z_k = \rho_k v_k, \quad \text{Eq.(10),}$$

for both fluid and formation, where $\rho_k$ is the density, and $v_k$ is the velocity. Re-arranging Equation 9 as:

$$Z_2 = Z_1 \left( \frac{1 + r_{12}}{1 - r_{12}} \right), \quad \text{Eq. (11)}$$

provides a solution for the acoustic impedance of the formation from the measured reflectivity, whereby the impedance (i.e., density and velocity) of the borehole fluid is estimated (or known). For LWD, in certain methods, the (dynamic) circulation density may be used instead of a (static) mud density.

The foregoing illustrative methods of the present disclosure may be extended to include a number of additional features. These include, for example, multiple layers (e.g., fluid-casing-cement-formation for cement bond logging; geometric divergence; an elastic attenuation; dispersion of the source wavelet; multiple reflections (e.g., within casing); tool rotation; and tool eccentricity.

Figure 8:
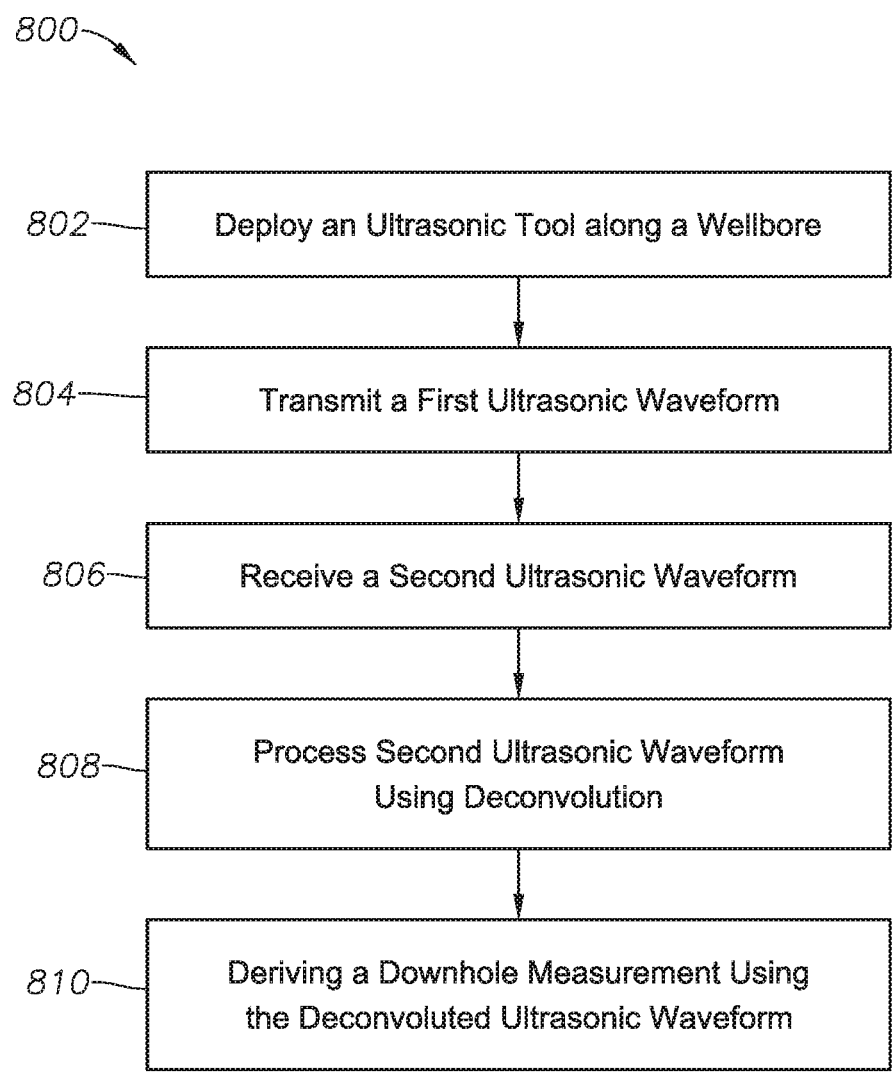
FIG. 8 is a flow chart of a method for processing downhole ultrasonic waveforms, according to certain illustrative methods of the present disclosure.

FIG. 8 is a flow chart of a method for processing downhole ultrasonic waveforms, according to certain illustrative methods of the present disclosure. At block 802 of method 800, an ultrasonic logging tool is deployed along a wellbore. Using the ultrasonic tool, a first ultrasonic waveform is transmitted at block 804, whereby it is attenuated in various ways by one or more reflectors present inside and outside the wellbore. At block 806, a second ultrasonic waveform (different from the first waveform given the attenuation) is received using the ultrasonic tool. At block 808, the second ultrasonic waveform is then processed using the deconvolution techniques described herein. At block 810, a downhole measurement (e.g., wellbore size, acoustic impedance, cement bond quality indicator, formation parameters, etc.) is derived using the deconvolved ultrasonic waveform.

A variety of deconvolution techniques may be applied. For example, in certain methods, the impulse response is derived by deconvolving the first ultrasonic waveform from the second ultrasonic waveform. A peak amplitude of the impulse response is then determined and used to derive the downhole measurement(s). In an alternative embodiment, however, amplitude spikes (other than the peak, e.g.) may also be used to derive the reflectivity profile, whereby multiple reflectors may be identified to derive the measurements.

Accordingly, the illustrative deconvolution based processing methods described herein provide a number of advantages. For example, they enable a robust method for calculating the two-way travel time for an ultrasonic caliper, particularly in the presence of multiple, proximal reflectors (e.g., mud cake, formation, casing, cement). The deconvolution processing is amplitude preserving, which allows quantitative information to be derived from the measurements (e.g., acoustic impedance). This is in contrast to conventional cross-correlation-based processing, which is not amplitude preserving, and cannot provide quantitative information such as acoustic impedance. Moreover, the disclosed methods of deconvolution, impedance processing and image generation can be operated in real-time. Moreover, in certain embodiments, the impedance can be qualified as a cement bond indicator.

Embodiments and methods of the present disclosure described herein further relate to any one or more of the following paragraphs:

1. A method for processing downhole ultrasonic waveforms, comprising deploying a logging tool along a wellbore wherein the logging tool comprises at least one ultrasonic transducer operating in a pulse-echo mode; transmitting a first ultrasonic waveform from at least one ultrasonic transducer; receiving a second ultrasonic waveform using the at least one ultrasonic transducer; processing the first and second ultrasonic waveforms using a deconvolution technique to generate an impulse response; and deriving at least one downhole measurement using the impulse response.

2. A method as defined in paragraph 1, wherein the deconvolution technique is applied to identify one or more downhole reflectors.

3. A method as defined in paragraphs 1 or 2, wherein the downhole measurement is one of a wellbore size, acoustic impedance, or a cement bond quality indicator.

4. A method as defined in any of paragraphs 1-3, further comprising acoustic impedance imaging of the wellbore using the downhole measurement.

5. A method as defined in any of paragraphs 1-4, wherein the processing comprises deconvolving the first ultrasonic waveform from the second ultrasonic waveform to thereby derive an impulse response; and determining an amplitude and travel-time of the impulse response, wherein the amplitude and travel-time is used to derive the downhole measurement.

6. A method as defined in any of paragraphs 1-5, wherein the processing comprises deconvolving the first ultrasonic waveform from the second ultrasonic waveform to thereby derive an impulse response; and determining a travel-time of the impulse response, wherein the travel-time is used to derive the downhole measurement.

7. A method as defined in any of paragraphs 1-6, wherein the first ultrasonic waveform is an a priori wavelet template.

8. A method as defined in any of paragraphs 1-7, wherein the first ultrasonic waveform is measured by the ultrasonic tool during transmission.

9. A method as defined in any of paragraphs 1-8, wherein the downhole measurement is derived using a downhole processor.

10. A method as defined in any of paragraphs 1-9, wherein the downhole measurement is used to plan, perform, or analyze a downhole operation.

11. A method as defined in any of paragraphs 1-10, wherein the ultrasonic tool is deployed via a wireline or drilling assembly.

12. A system for processing downhole ultrasonic waveforms, comprising deploying a logging tool along a wellbore wherein the logging tool comprises at least one ultrasonic transducer operating in a pulse-echo mode; and processing circuitry communicably coupled to the ultrasonic tool to perform an operation comprising: transmitting a first ultrasonic waveform from the at least one ultrasonic transducer; receiving a second ultrasonic waveform using the at least one ultrasonic transducer; processing the first and second ultrasonic waveforms via a deconvolution technique to generate an impulse response; and deriving at least one downhole measurement using the impulse response.

13. A system as defined in paragraph 12, wherein the downhole measurement is one of a wellbore size, acoustic impedance, or a cement bond quality indicator.

14. A system as defined in paragraphs 12 or 13, wherein the processing comprises deconvolving the first ultrasonic waveform from the second ultrasonic waveform to thereby derive an impulse response; and determining an amplitude of the impulse response, wherein the amplitude is used to derive the downhole measurement.

15. A system as defined in any of paragraphs 12-14, wherein the processing comprises deconvolving the first ultrasonic waveform from the second ultrasonic waveform to thereby derive an impulse response; and determining a travel-time of the impulse response, wherein the travel-time is used to derive the downhole measurement.

16. A system as defined in any of paragraphs 12-15, wherein the first ultrasonic waveform is an a priori wavelet template.

17. A system as defined in any of paragraphs 12-16, wherein the first ultrasonic waveform is measured by the system during transmission.

18. A system as defined in any of paragraphs 12-17, wherein the downhole measurement is derived using a downhole processor.

19. A system as defined in any of paragraphs 12-18, wherein the ultrasonic tool is positioned along a wireline or drilling assembly.

Furthermore, the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed:

1. A method for processing downhole ultrasonic waveforms, comprising:
    deploying a logging tool along a wellbore wherein the logging tool comprises at least one ultrasonic transducer operating in a pulse-echo mode;
    transmitting a source wavelet from the at least one ultrasonic transducer;
    receiving a second ultrasonic waveform using the at least one ultrasonic transducer;
    processing the source wavelet and second ultrasonic waveforms using a deconvolution technique to generate an impulse response, wherein the deconvolution technique preserves an amplitude of the source wavelet and applies the preserved amplitude to the second ultrasonic waveform to identify a deconvolved amplitude spike of the second ultrasonic waveform, thereby generating the impulse response;
    using the deconvolved amplitude spike to calculate a two-way travel time between the source wavelet and second ultrasonic waveform; and
    deriving at least one downhole measurement using at least one of the deconvolved amplitude spike or two-way travel time of the impulse response.

2. A method as defined in claim 1, wherein the deconvolution technique is applied to identify one or more downhole reflectors.

3. A method as defined in claim 1, wherein the downhole measurement is one of a wellbore size, acoustic impedance, or a cement bond quality indicator.

4. A method as defined in claim 1, further comprising acoustic impedance imaging of the wellbore using the downhole measurement.

5. A method as defined in claim 1, wherein the source wavelet is an a priori wavelet template.

6. A method as defined in claim 1, wherein the source wavelet is measured by the ultrasonic tool during transmission.

7. A method as defined in claim 1, wherein the downhole measurement is derived using a downhole processor.

8. A method as defined in claim 1, wherein the downhole measurement is used to plan, perform, or analyze a downhole operation.

9. A method as defined in claim 1, wherein the ultrasonic tool is deployed via a wireline or drilling assembly.

10. A non-transitory computer-readable medium comprising instructions which, when executed by a processor, causes the processor to perform any one of the methods of claims 1-9.

11. A system for processing downhole ultrasonic waveforms, comprising:
    deploying a logging tool along a wellbore wherein the logging tool comprises at least one ultrasonic transducer operating in a pulse-echo mode; and
    processing circuitry communicably coupled to the logging tool to perform an operation comprising:
        transmitting a source wavelet from the at least one ultrasonic transducer;
        receiving a second ultrasonic waveform using the at least one ultrasonic transducer;
        processing the source wavelet and second ultrasonic waveforms via a deconvolution technique to generate an impulse response, wherein the deconvolution technique preserves an amplitude of the source wavelet and applies the preserved amplitude to the second ultrasonic waveform to identify a deconvolved amplitude spike of the second ultrasonic waveform, thereby generating the impulse response;
        using the deconvolved amplitude spike to calculate a two-way travel time between the source wavelet and second ultrasonic waveform; and
        deriving at least one downhole measurement using at least one of the deconvolved amplitude spike or two-way travel time of the impulse response.

12. A system as defined in claim 11, wherein the downhole measurement is one of a wellbore size, acoustic impedance, or a cement bond quality indicator.

13. A system as defined in claim 11, wherein the source wavelet is an a priori wavelet template.

14. A system as defined in claim 11, wherein the source wavelet is measured by the system during transmission.

15. A system as defined in claim 11, wherein the downhole measurement is derived using a downhole processor.

16. A system as defined in claim 11, wherein the ultrasonic tool is positioned along a wireline or drilling assembly.

* * * * *